United States Patent
Baker et al.

(10) Patent No.: US 12,253,730 B2
(45) Date of Patent: Mar. 18, 2025

(54) SYSTEM FOR GUIDING A DIELECTRIC CABLE FROM PHASE-TO-GROUND POTENTIAL

(71) Applicant: TRATOS CAVI UK LTD., Swindon Wiltshire (GB)

(72) Inventors: James Baker, Swindon Wiltshire (GB); Mark Naylor, Swindon Wiltshire (GB)

(73) Assignee: TRATOS CAVI UK LTD., Swindon Wiltshire (GB)

( * ) Notice: Subject to any disclaimer, the term of this patent is extended or adjusted under 35 U.S.C. 154(b) by 289 days.

(21) Appl. No.: 17/780,187

(22) PCT Filed: Nov. 27, 2020

(86) PCT No.: PCT/GB2020/053045
§ 371 (c)(1),
(2) Date: May 26, 2022

(87) PCT Pub. No.: WO2021/105707
PCT Pub. Date: Jun. 3, 2021

(65) Prior Publication Data
US 2022/0413241 A1    Dec. 29, 2022

(30) Foreign Application Priority Data

Nov. 29, 2019  (GB) .................................... 1917485

(51) Int. Cl.
*G02B 6/44*   (2006.01)
*G02B 6/48*   (2006.01)

(52) U.S. Cl.
CPC ............. *G02B 6/442* (2013.01); *G02B 6/483* (2013.01)

(58) Field of Classification Search
CPC .......... H02G 7/22; H02G 7/205; G02B 6/483; G02B 6/442
See application file for complete search history.

(56) References Cited

U.S. PATENT DOCUMENTS

| | | | | |
|---|---|---|---|---|
| 3,898,372 A | * | 8/1975 | Kalb ...................... | H01B 17/14 174/158 R |
| 6,118,918 A | * | 9/2000 | Gross ...................... | G02B 6/442 385/139 |

(Continued)

FOREIGN PATENT DOCUMENTS

| DE | 4227410 C1 | 11/1993 |
|---|---|---|
| DE | 4438231 A1 | 5/1996 |

(Continued)

OTHER PUBLICATIONS www.aflglobal.com/Products/Conductor-Accessories/Fiber-Optic-Cable-Hardware/SkyWrap-Hardware/SkyWrap-Termination-Joint%E2%80%94Phase-Wire.aspx.

*Primary Examiner* — Hoa C Nguyen
*Assistant Examiner* — Amol H Patel
(74) *Attorney, Agent, or Firm* — FISHERBROYLES, LLP; Roger L. Browdy; Ronni S. Jillions

(57) ABSTRACT

A system is provided for guiding a dielectric cable from a conductor to an elevated support structure. The system comprises: an insulator arranged to be attached to a conductor. The insulator comprises a first bore for receiving a dielectric cable. The system further comprises an earth bond extending to a lower end of the insulator; and a downpipe extending between first and second ends. The first end of the downpipe is connected to the lower end of the insulator and the second end of the downpipe is arranged to be supported by an elevated support structure. The downpipe is for receiving the dielectric cable from the bore of the insulator.

17 Claims, 5 Drawing Sheets

(56) References Cited

U.S. PATENT DOCUMENTS

| | | |
|---|---|---|
| 6,222,968 B1 | 4/2001 | Dotzer et al. |
| 6,507,692 B1 | 1/2003 | Hoefner et al. |
| 2014/0340806 A1 | 11/2014 | Davis et al. |

FOREIGN PATENT DOCUMENTS

| | | |
|---|---|---|
| DE | 19624091 A1 | 12/1997 |
| EP | 0112163 A2 | 6/1984 |
| EP | 0364289 A2 | 4/1990 |
| EP | 0265737 B1 | 7/1992 |
| GB | 2169099 A | 7/1986 |
| WO | 0137022 A1 | 5/2001 |

\* cited by examiner

SYSTEM FOR GUIDING A DIELECTRIC CABLE FROM PHASE-TO-GROUND POTENTIAL

It is well known to provide communication links along overhead conductors such as power lines. The communication links may provide, for example, an internet connection. Typically, these links use dielectric cables incorporating optical fibres as these fibres are immune to the effects of electrical interference. The cable may be attached to the overhead conductor for example by being wrapped along it, in a generally helical pattern.

The dielectric cable may be wrapped on an earth wire (i.e. a wire at earth potential) or a current carrying phasewire. Earthwire wrapped installations are simpler because there are fewer electrical issues. However, an earthwire is not always present and hence the dielectric cable may have to be wrapped on the phasewire. In this case, the more severe electrical issues need to be addressed. For example, at the ends of the installation the dielectric cable must be brought down from phase-to-ground potential. For example, this may be necessary as the dielectric cable travels from the phasewire to a support structure for the phasewire.

The dielectric cable wrapped on the conductor is typically relatively small in diameter (in the region of 6 to 9 mm) and flexible. Accordingly, it must be supported as it is guided from the conductor to the tower in order to avoid mechanical damage. The supporting components must also protect the cable electrically. Whatever the support means it will incorporate dielectric (i.e. intrinsically non-conducting) sections which will be subject to the full phase-to-ground potential. For a dielectric material this is not immediately a problem because no currents flow. However, when its surface becomes wet, surface leakage currents will flow in the wet layer. As the conductors are installed outside this is a common issue. As the surface dries out these currents can arc across the newly formed dry patches and this can cause damage. The process is known as "dry band arcing". A wet and polluted surface will allow even greater potentially destructive dry band arcing.

WO 98/00742 A1 discloses an insulator held vertically on a bracket extending from a pole, with a fibre optic cable passing through the insulator to the pole. In order to generally apply the teaching of this document, the support bracket needed to vertically mount the insulator must be custom designed to suit the particular type of support structure and its detailed construction. The example illustrated is perhaps the easiest of all: a wooden pole. A more complicated support structure is a lattice tower in which none of the struts or legs are vertical. In general, therefore the design of the bracket can be complicated even when plans of the tower system are available; if they are not available, the tower may first have to be surveyed. Also, in the illustrations in WO 98/00742 A1 the cable is not supported above and below the insulator, in particular the cable passes freely (i.e. unsupported) between the conductor and the top of the insulator. The system therefore accommodates movement of the conductor, for example due to ice and wind loading, but at the expense of leaving the cable unsupported and therefore at risk of mechanical damage.

EP 0 112 163 A2 discloses an insulator that is designed to protect a dielectric cable, both mechanically and electrically, as it passes from the conductor to the tower. The insulator is up to 5 metres in length which is both long and flexible enough to guide the cable from the conductor to an earthed bracket 74 on the tower without needing to know in advance exactly where the ends of the insulator will be placed. The earth bond does not extend away from the tower in the direction of the insulator. Of course some basic information is needed e.g. the diameter of the conductor. The insulator also protects the cable electrically by limiting the magnitude of the surface leakage currents, for example by the provision of sheds at the top of the insulator. Also, since the length of the insulator from the conductor to the earthed bracket is subject to leakage currents and since the position of the bracket is not known in advance (and may even not be present if, for example, the insulator should be installed in a U-shape rather than following a swan-neck shape) the entire length of its dielectric surface is made of an arc-resistant material (usually called an anti-tracking material). This is not always a cost effective way to guide the cable from the conductor to the tower.

For practical reasons these insulators are fabricated in the factory in pre-determined lengths in the range 3 to 5 metres, typically 3, 4 and 5 metres. The use of an earthed bracket (13 in FIGS. 2 and 74 in FIG. 8 of EP 0 112 163 A2) enables these set lengths to be adapted to particular tower systems. Note however that when a bracket is used the section of insulator below it no longer needs to have any special electrical properties.

US 2014/0340806 A1 discloses a stress control apparatus for managing effects caused by electrical stress in a high voltage environment, and methods of manufacturing the apparatus.

U.S. Pat. No. 6222968 B1 discloses a cable fitting which receives light waveguide cables, which are supported by high-voltage overhead lines, or their light waveguide splices and excess lengths.

DE 4438231 A1 discloses a coupling unit designed to allow leading out an optical cable from an overhead power cable system.

WO 01/37022 A1 discloses a sealing end for at least one phase cable in which an optical wave guide is guided, for reducing said optical wave guide from a high voltage to earth potential through a splice housing.

U.S. Pat. No. 6,507,692 B1 discloses an insulator constructed in two parts which can also be fastened to an already-laid ADL cable.

DE 19624091 A1 discloses a device for transmitting light between two points with a different electric potential and a process for manufacturing such a device.

EP 0364289 A2 discloses an optical fibre built-in type composite insulator having at least two insulator bodies each having a penetration bore.

There is therefore a need for an improved system for guiding a dielectric cable from a phase conductor to a tower.

The present invention provides a system for guiding a dielectric cable according to claim 1. This system allows the use of the simpler downpipe which can readily be cut to measure in the field in order to simplify the installation. Furthermore, the insulator is relatively shorter than prior art systems which reduces the need for specialised insulated components and hence the cost of the system. Furthermore, the system is more versatile because the guiding system (i.e. the insulator and downpipe) is not fabricated in the factory in pre-determined lengths up to a maximum length.

The insulator is simply designed for the conductor voltage without also needing to guide the cable from the conductor all the way to the tower. The simpler downpipe guides the cable from the bottom of the insulator to the tower. It can be attached to the tower anywhere along its length and can even if necessary be cut to length on site. The earth bond may extend from the elevated support structure to the insulator, with the downpipe supporting it across this extension.

The system has the additional advantage that it is adaptable so does not require detailed information about the tower. Also, the use of relatively expensive components (i.e. the components that protect the cable electrically) is minimised.

Preferably the downpipe also guides the earth bond towards its earthing point at the bottom of the tower i.e. at ground level.

The system may further comprise: a dielectric cable extending through the bore of the insulator and the downpipe; and an insulating material filling a space between an inner surface of the bore and the dielectric cable. This filling prevents the flow of any internal leakage currents and thereby forces any leakage currents to be surface currents.

The downpipe may be formed of a flexible material. This enhances the ease of which the system can be installed for any tower configuration.

The insulator may further comprise a second bore for receiving a second dielectric cable.

It is typical for the length of an installation to exceed the cable drum capacity; therefore it is necessary to provide in-line splices. In the case of a splice where access to the splice enclosure is needed at ground potential it is known to provide two insulators of the type described "back-to-back"with the splice enclosure in-between. This has the disadvantage of requiring two insulators. To address this disadvantage, the system may comprise an insulator having two bores to guide and protect each of the cables to be spliced. This allows a grounded splice to be installed with a single insulator which is simpler than the prior art. Preferably only one downpipe is used to guide the cables to the splice enclosure and also guide the earth bond.

The downpipe may support the earth bond in its extension to the insulator. Preferably, the earth bond may extend through or be attached to the downpipe. This simplifies the design and co-locates the relevant components.

The insulator may have a length of less than 600 millimetres, preferably less than 500 millimetres, most preferably less than 400 millimetres. In a particular embodiment, the insulator may have a length of less than 350 millimetres, preferably the insulator may have a length of approximately 300 millimetres. The insulator is rated for the voltage of the phasewire and this is the only requirement when determining the necessary length. These lengths may be suitable for an insulator rated at 35 kV.

The insulator may be formed of a plurality of insulator sections, each insulator section comprising: a first end flange; a second end flange; and a central portion connecting the first and second end flanges, the central portion narrower than the first and second end flanges, wherein the first end flange comprises a plurality of clearance holes, and the second end flange comprises a plurality of tapped holes corresponding in location to the clearance holes, each for receiving a screw passing through the corresponding clearance hole to connect adjacent insulator sections to form the insulator. The insulator sections can be connected to one another in order to rate the insulator at multiples of the rating of a single section via this concatenation. This may be particularly useful for use at voltages above 35 kilovolts.

Each insulator section may be rated for between 33 and 40 kilovolts, preferably 35 kilovolts. This would typically be suitable for a system installed on the common 33 kilovolt transmission lines, while being readily scalable to higher voltage lines.

The present invention further provides a method of installing a system for guiding a dielectric cable from a conductor to a tower according to claim 11.

The method of claim may further comprise the step of: filling a gap space between the dielectric cable and the inner surface of the bore with a liquid insulating material which sets over a given period to a gel. This filling prevents the flow of any internal leakage currents.

The present invention will now be described, by way of example only, with respect to the accompanying drawings in which.

Figure 1:
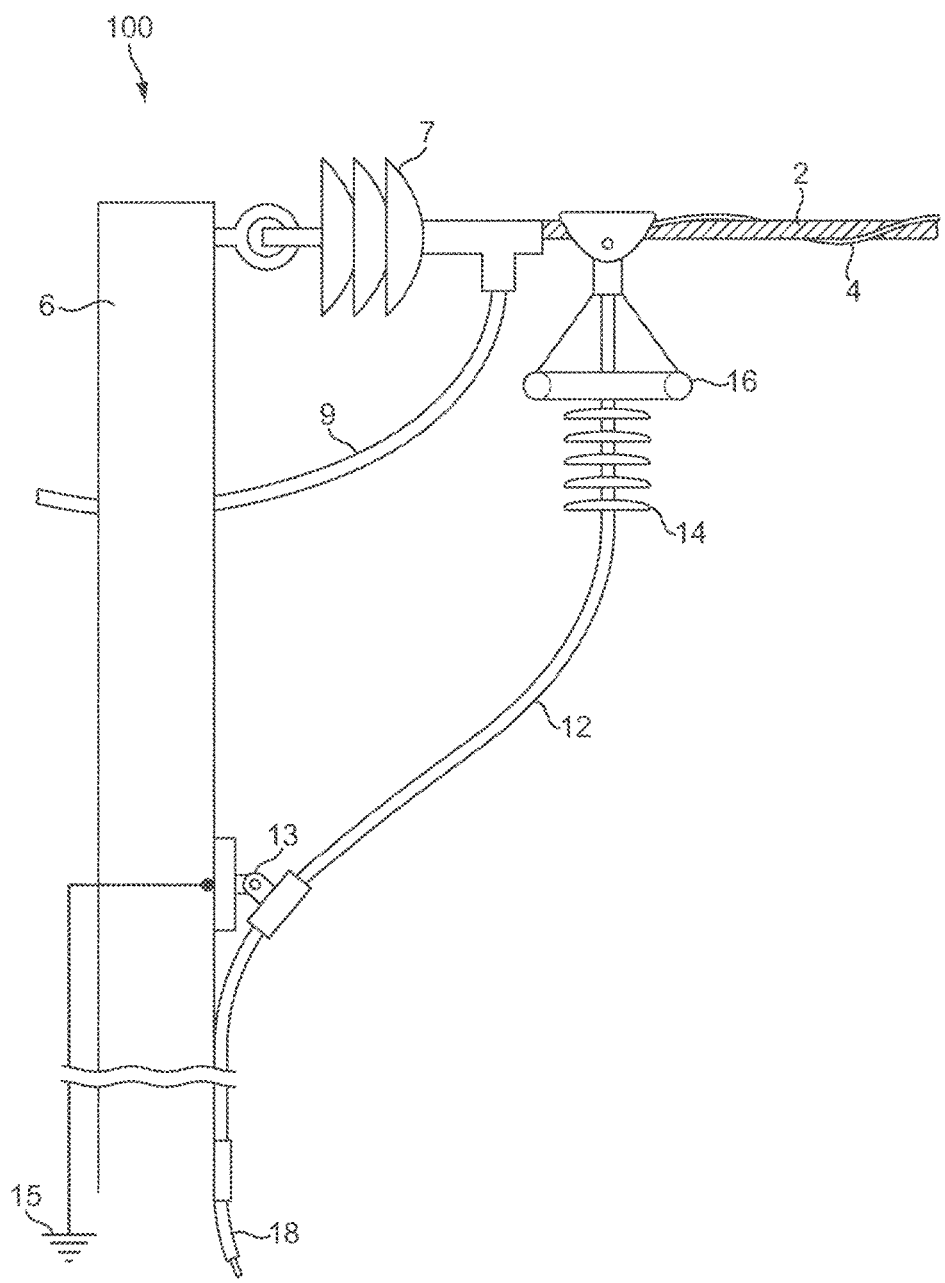
FIG. 1 shows a prior art system for guiding a dielectric cable to a pole.
Figure 2:
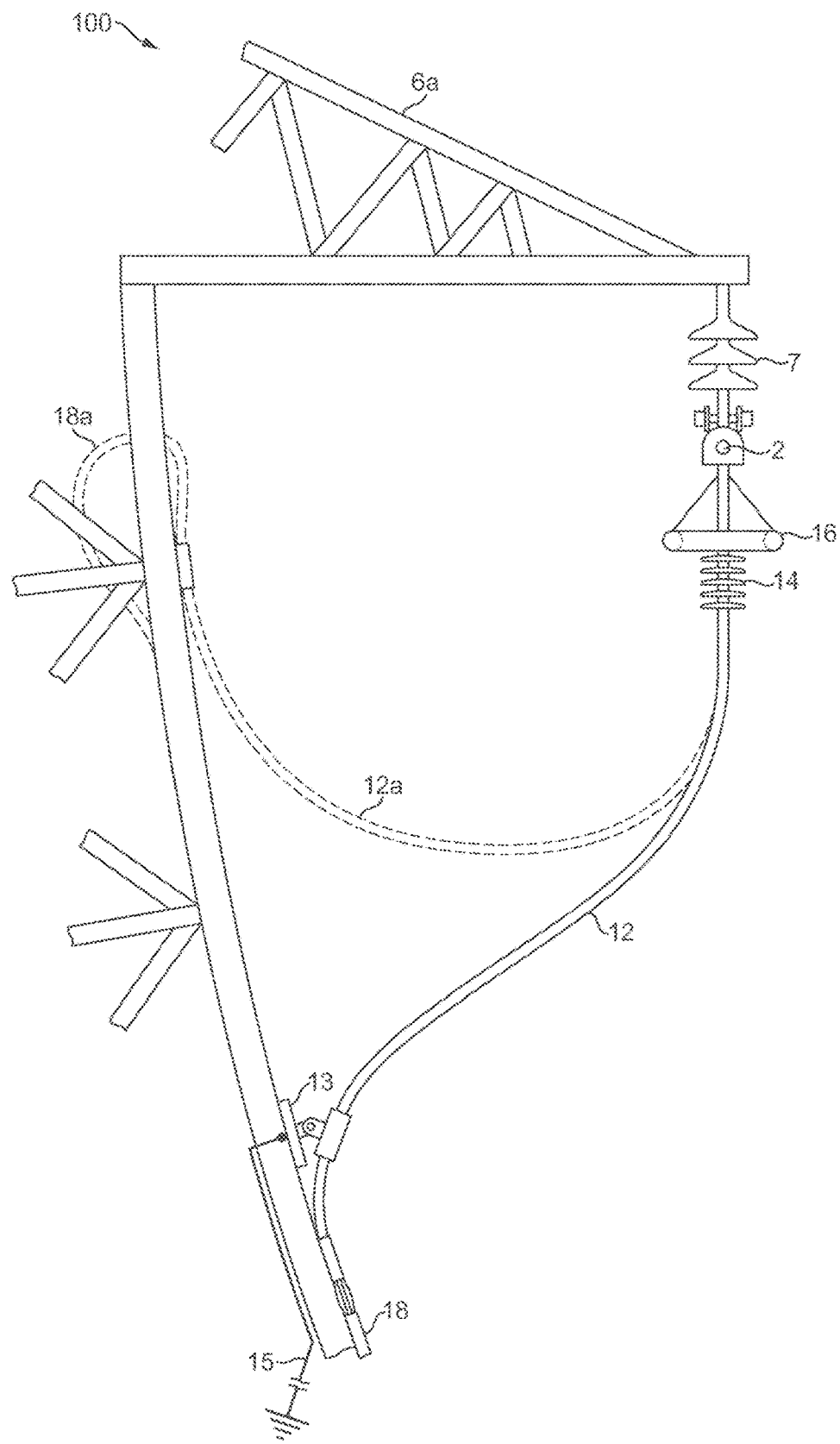
FIG. 2 shows a prior art for guiding a dielectric cable to a lattice suspension tower.

FIGS. 1 and 2 show a prior art system 100 for guiding a dielectric cable 4 from conductor 2 to an tower 6, 6a. The conductor 2 can also be generally identified as a power transmission cable, and the tower 6, 6a as any elevated support structure as discussed above. The conductor 2 may be a high-voltage cable. High-voltage may generally be defined as a voltage greater than 650V AC. Particularly, high-voltage may be defined as a voltage above 1000V AC.

As can be seen in these Figures, the dielectric cable 4 is preferably wrapped around the conductor 2 in a helical path. However, the dielectric cable 4 may be installed along the conductor 2 in any suitable manner. For example, the dielectric cable 4 may be installed along the conductor 2 by lashing. In this sense, the dielectric cable 4 is supported by the conductor 2. In FIG. 1, the conductor 2 reaches the tower 6 and is electrically isolated therefrom via an insulator 7. The conductor 2 is electrically connected to the next conductor in an adjacent span (not shown) via a jumper lead 9. In FIG. 2, the lattice tower 6a is a suspension tower; it only holds up the conductor 2 via the insulator 7. As stated above, the tower 6, 6a may be any conventional support structure known in the art, including but not limited to poles (wooden or concrete) 6, lattice towers 6a or any other suitable structure.

As discussed above, the conductor 2 is at a high voltage (typically 33 kilovolts) and it is therefore necessary to have a safe way to bring the dielectric cable 4 down to a ground potential. Conventionally, this has been achieved by means of an insulator 12 with a bore extending along its length. In particular, the insulator 12 may be in the form of a tube. This insulator 12 has a surface made of anti-tracking (or track-resistant) material. The upper section of the insulator 12 is provided with sheds 14 to increase the phase-to-ground surface resistance and thereby limit potentially damaging surface leakage currents. A corona ring 16 may also be provided to supress corona discharge from any metalwork.

The dielectric cable 4 is fed down the bore of the insulator 12 and the annulus between the dielectric cable 4 and the bore is filled with a liquid insulating material that sets over a given period to a gel. This solid construction is water-blocked and therefore prevents the flow of potentially damaging internal leakage currents. The insulator 12 is generally flexible and may be secured to the tower 6 via an attachment bracket 13. This attachment bracket 13 is connected to an earth point 15 and acts as a lower (earthed) end of the insulator 12. The dielectric cable 4 can then extend from this lower section of the insulator 12 (i.e. below the bracket 13) as shown in FIG. 1 to ground level for use as necessary. In particular, the dielectric cable 4 may extend via a downpipe 18 to connect to the next component, for example an underground cable (not shown). The downpipe 18 may be made of a relatively cheap material as it does not have any special insulating properties as it is provided downstream of the bracket 13 which acts as the grounding point for the insulator 12. In this case the section of insulator 12 between the earthing point 13 and the downpipe 18 also does not need to have any special insulating properties.

This prior art system 100 requires the use of an insulator 12 to guide the dielectric cable from the conductor 2 to the support structure 6. The entire length of this insulator 12 may be subject to the phase-to-ground voltage and therefore the entire length must be made to withstand potentially damaging surface leakage currents. This in part is achieved by ensuring that the surface is made of anti-tracking components. Since these components are relatively expensive this is not a cost effective solution, particularly in the case where an earthing bracket 13 is used.

In a typical installation, splices are needed at intermediate locations. In some situations, access to the splices may be required without de-energising the overhead power line. Accordingly, two of the systems 100 shown in FIG. 1 and FIG. 2 are provided back-to-back so a splice enclosure can be mounted between them at ground potential and hence can be accessible from the ground without the need to de-energise the powerline.

Figure 3:
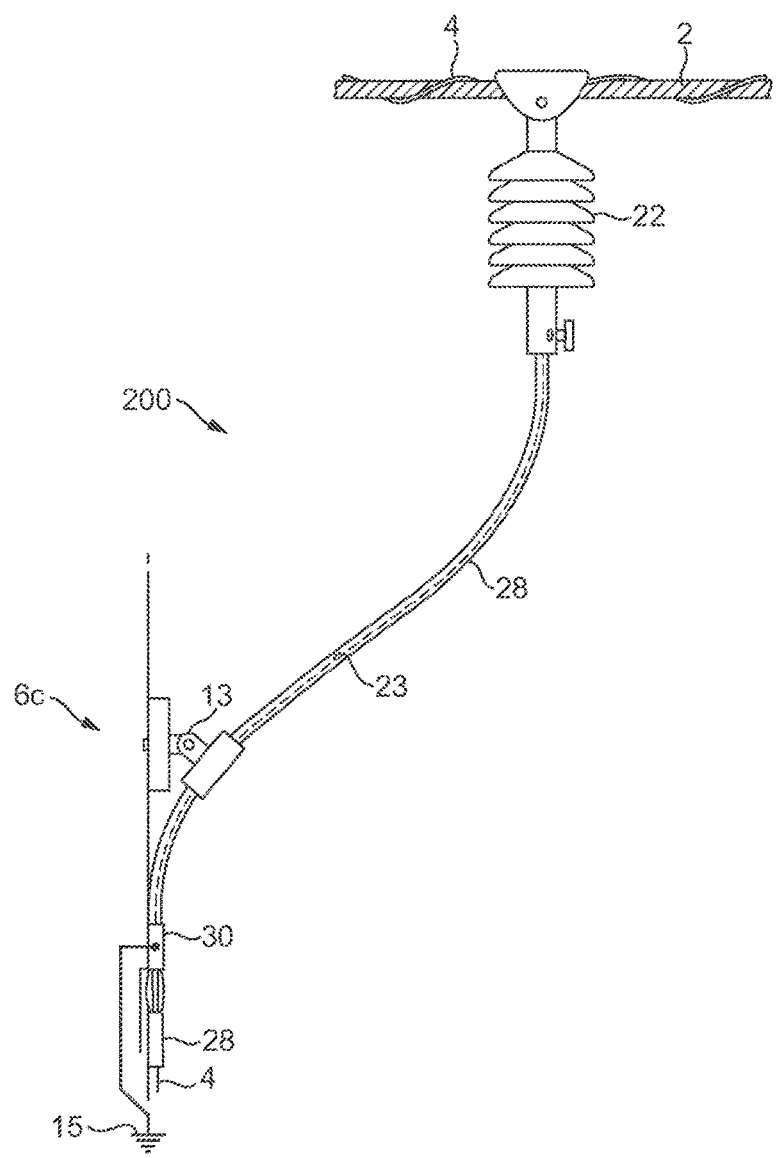
FIG. 3 shows a system for guiding a dielectric cable according to the present invention in an in-line splice embodiment and hence two dielectric cables passing through the insulator.
Figure 4:
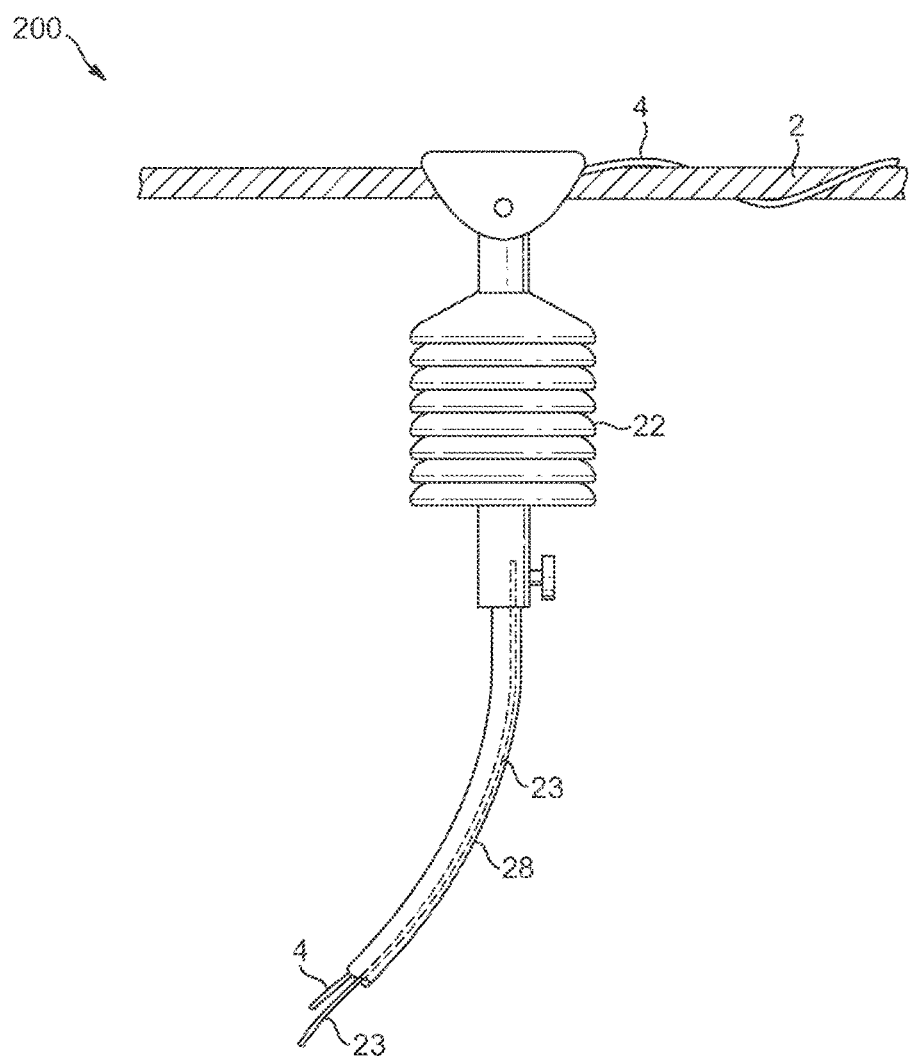
FIG. 4 shows a close-up view of a portion of the system of FIG. 3 with a single dielectric cable passing through the insulator.

A system 200 for guiding a dielectric cable 4 from a conductor 2 to a support structure 6*c* such as a tower according to the present invention is shown in FIGS. 3 and 4. FIG. 3 shows the system 200 being used as an in-line splice, with the dielectric cable 4 continuing to be supported by the conductor 2 beyond the insulator 22. The in-line splice arrangement will be described in detail below. In summary, a first section of the dielectric cable 4 extends from the conductor 2, and a second section of the dielectric cable 4 extends back up to the conductor 2.

FIG. 4 shows the system 200, with only the first section of the dielectric cable 4 shown. Thus, the system 200 shown in FIG. 4 is not operating as an in-line splice. The technical functioning of the system 200 of FIGS. 3 and 4 are substantially the same and will be described collectively below.

This system 200 is generally similar to the prior art system 100 described above. The dielectric cable 4 is likewise wrapped or in any case attached to the conductor 2, and is guided from this conductor 2 to the support structure 6*c*.

An insulator 22 is provided attachable to the conductor 2. The insulator 22 is preferably freely hanging from the conductor 2. That is, the lower end of the insulator 22 is not directly attached to the tower. The insulator 22 may be, for example, rated at 35 kilovolts for use with a powerline voltage of 33 kilovolts. In embodiments discussed in more detail below, the insulator 22 may be formed of one or more insulator sections attached to one another. The insulator 22 is relatively large in diameter. In particular, the diameter of the insulator 22 may be greater than 90 mm, greater than 100 millimetres, or greater than 110 millimetres. Particular embodiments may have diameters of approximately 95 millimetres, 110 millimetres, or 120 millimetres. At least one bore 56 passes through the insulator 22 and the dielectric cable 4 extends through this bore 56. The bore 56 may be filled with a gel in the usual manner as described above in relation to the prior art system 100. Unlike the prior art system 100, the insulator 22 does not span from the power conductor 2 to the tower 6*c*. The lower end of the insulator 22 is generally freely hanging from the power conductor 2.

Typically, the minimum length of the insulator 22 may be 300 mm for a typical 33 kV overhead powerline. The insulator 22 may of course be longer as this would increase its rated voltage. In particular embodiments, the insulator 22 may have a total length of less than 600 mm, preferably a total length of less than 500 mm, more preferably a total length of less than 400 mm. In specific embodiments, the insulator 22 may have a total length of approximately 300 mm. An earth bond 23 extends from the earth potential 15 up to the lower end of the insulator 22 as can be seen in FIGS. 3 and 4. The earth bond 23 is electrically connected to earth potential 15. This earth bond 23 may typically be a small diameter metal wire which is attached to the base of the insulator 22 and the earth. The earth bond 23 may be carried within a downpipe 28. The downpipe 28 also receives the dielectric cable 4 and act to physically support the dielectric cable 4 between the lower end of the insulator 22 and the tower 6.

As the insulator 22 is connected to the earth bond at its lower end, the entire length of the downpipe 28 does not need to have any particular electrical properties. Accordingly, it can be a simple plastic component which can be readily fitted to length as required. The downpipe 28 spans a gap between the insulator 22 and the tower. This contrasts the prior art where the insulator extends all the way to the tower.

This minimises the length of phase-to-ground insulator required.

Figure 5:
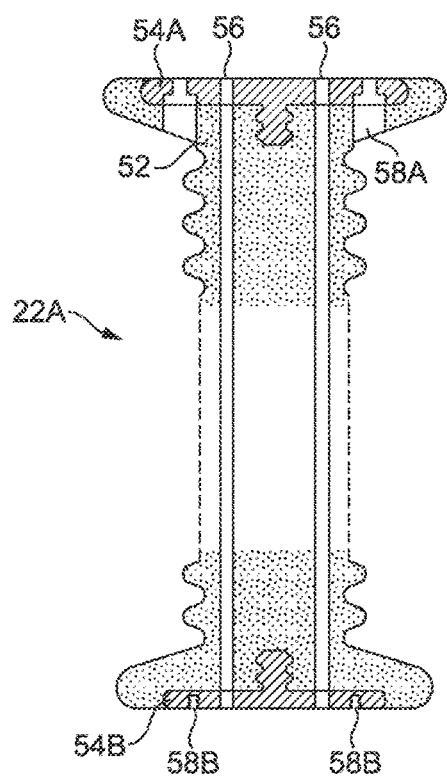
FIG. 5 shows an isolated view of an insulator for use in the system of FIG. 3.

An isolated view of an insulator section 22A is shown in FIG. 5. The insulator section 22A may be formed of first and second end portions 54A, 54B and a central section 52 extending there between. The first and second end portions 54A, 54B comprise first and second end flanges which extend radially outward of the central section 52. The central section 52 may be formed of an insulating material, for example an epoxy resin. The central section 52 may further comprise a plurality of sheds (or radial projections) as shown in FIG. 5.

Each end portion 54A, 54B may be a conductive material such as metal end plates. The metal end plates may be, for example, cast into the ends of the insulator section 22A.

Given the relatively large diameter of the insulator section 22A, the two through bores 56 may be formed there through. However, in alternative embodiments only a single bore 56 may be formed through the insulator section 22A. The two through bores 56 may be separated by a distance greater than 40 millimetres, preferably greater than 55 millimetres, more preferably greater than 65 millimetres. In particular embodiments, the distance between the two through bores 56 may be approximately 45 millimetres, 60 millimetres or 70 millimetres. This allows one or two dielectric cables 4 to pass through the insulator section 22A. In particular, this may allow a splice location to be located with a single system 200 according to the present invention.

That is, the dielectric cable 4 may extend from the power transmission cable 2 into a first of the bores 56 down towards a splice location and then up via the other of the bores 56 to then re-join the power transmission cable 2. This is a much simpler system than the prior art which requires two systems 100 in order to include an intermediate splice location. Each dielectric cable may pass through the same downpipe 28. Alternatively, first and second downpipes may be provided with each dielectric cable passing through its own downpipe 28. This provides an in-line splice as shown in FIG. 3. Of course, it is possible to route only a single section of the dielectric cable 4 through the insulator 22, such as in the system 200 of FIG. 4.

As mentioned above, the insulator 22 may be formed of one or more insulator sections 22A. Each insulator section 22A may be rated to a particular voltage, for example between 33 and 40 kilovolts, preferably 35 kilovolts. Alternatively, each insulator section 22A may be rated to a lower voltage, for example between 11 and 20 kV. A single insulator section 22A may be used as an insulator 22 if the single section 22A is rated for a sufficiently large voltage. For example, if a single insulator section 22A is rated to 35 kilovolts it may be used with a transmission line at 33 kilovolts. In this sense, the above description may apply in its entirety to an insulator 22 as a whole formed of a single insulator sections 22A.

Figure 5A:
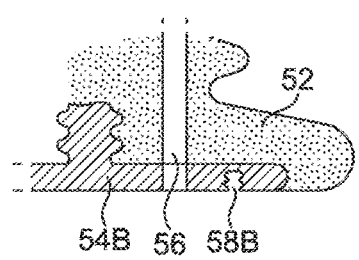
FIG. 5a shows an exploded view of an end portion of the insulator of FIG. 5.

In cases where it is necessary to be rated to a higher voltage (for example 70 kilovolts) multiple insulator sections 22A may be connected together to form a single insulator 22. In order to achieve this the top and bottom ends 54A, 54B of the insulator sections 22A may comprise attachment regions 58A, 58B. In particular, one end of the first and second ends 54A, 54B may comprise a threaded tapped hole 58B as shown in FIG. 5A. This threaded tapped hole 58B may be blind tapped hole as shown in this Figure or may extend through the flange of the central portion 52.

The top of the top insulator section 22A and the bottom of the bottom insulator section 22A may follow the design of the single section insulator 22 to enable the multiple section insulator to be installed in a similar manner. In particular, the downpipe 28 and earth bond 23 are used to provide the necessary adaptability while keeping the cost to a minimum.

At the upper end of the insulator section 22A there is a provided a clearance hole 58A extending through the end 54A and a flange of central portion 52. This clearance hole 58A may be a recessed as shown in the Figures with an internal shoulder so that the screw heads do not sit proud of the insulator surface. This clearance hole 58A receives a screw or other fastening component for attaching to a corresponding attachment means 58B of a further insulator section. This allows each insulator section to act as a complete insulator in its own right or be attached to another in order to form an insulator rated for a high voltage. This ensures easy scaling of the system as appropriate.

The system 200 is installed by attaching the insulator 22 to the conductor 2. The dielectric cable 4 is passed through the insulator 22 via a bore formed therein. A length of downpipe sufficient to bridge the distance between the lower end of the insulator 22 and the tower 6, 6a may then be cut. This can be done in advance of the installation or may be done in the field based upon measurements taken as the system 200 is being installed. The dielectric cable 4 is then passed through this downpipe 28. An earth bond 23 is then connected to a lower end of the insulator 22 and is attached to or received in the downpipe 28. At some convenient point (e.g. via metallic coupling 30) the electrical connection to the earth 15 is made. In this embodiment the bracket 13 performs no electrical (i.e. earthing) function and its use may be optional if the downpipe 28 does not need support. The downpipe 28 is then attached to the tower 6c and continues with the cable 4 all of the way down the tower 6c. In this manner, the system 200 according to the present invention can be readily tailored for the particular location.

The invention claimed is:

1. A system for guiding a dielectric cable from a conductor to an elevated support structure comprising:
   an insulator arranged to be attached to a conductor comprising a first bore for receiving a dielectric cable;
   an earth bond extending to a lower end of the insulator; and
   a downpipe extending between first and second ends, the first end connected to the lower end of the insulator and the second end arranged to be supported by an elevated support structure, the downpipe for receiving the dielectric cable from the bore of the insulator,
   wherein the downpipe is formed of a flexible material.

2. The system of claim 1, further comprising:
   a dielectric cable extending through the bore of the insulator and the downpipe; and
   an insulating material filling a space between an inner surface of the bore and the dielectric cable.

3. The system of claim 1, wherein the insulator further comprises a second bore for receiving a second dielectric cable.

4. The system of claim 1, wherein the downpipe supports the earth bond in its extension to the insulator.

5. The system of claim 1, wherein the insulator has a rating which exceeds a transmission voltage of the conductor.

6. The system of claim 5, wherein the insulator has a length selected to define its rating.

7. The system of claim 1, wherein the insulator has a length of less than 600 millimetres.

8. The system of claim 1, wherein the insulator is formed of a plurality of insulator sections, each insulator sections comprising:
   a first end flange;
   a second end flange; and
   a central portion connecting the first and second end flanges, the central portion narrower than the first and second end flanges,
   wherein the first end flange comprises a plurality of clearance holes, and the second end flange comprises a plurality of tapped holes corresponding in location to the clearance holes, each for receiving a screw passing through the corresponding clearance hole to connect adjacent insulator sections to form the insulator.

9. The system of claim 8, wherein each insulator section is rated for between 33 and 40 kilovolts.

10. The system of claim 8, wherein each insulator section is rated for 35 kilovolts.

11. The system of claim 1, wherein the insulator has a length of less than 500 millimetres.

12. The system of claim 1, wherein the insulator has a length of less than 400 millimetres.

13. The system of claim 1, wherein the earth bond extends through or is attached to the downpipe.

14. The system of claim 1, wherein the insulator has a rating which is between 100% and 110% of the transmission voltage.

15. The system of claim 14, wherein the insulator has a length selected to define its rating.

16. A method of installing a system for guiding a dielectric cable from a conductor to an elevated support structure comprising the steps of:
   attaching an insulator comprising a bore to a conductor;
   connecting an earth bond to the insulator;
   passing a dielectric cable through the bore;
   cutting a downpipe to a length for bridging a distance between a lower end of the insulator and an elevated support structure;
   passing the dielectric cable through the downpipe; and attaching a first end of the downpipe to the lower end of the insulator and a second end of the downpipe to the elevated support structure.

17. The method of claim 16, further comprising the step of:
   filling a space between the dielectric cable and the inner surface of the bore with a liquid insulating material which sets over a given period to a gel.

\* \* \* \* \*